United States Patent
Bak

[19]

[11] Patent Number: 5,913,807
[45] Date of Patent: Jun. 22, 1999

[54] TURBOJET ENGINE START SYSTEM

[75] Inventor: Michael J. Bak, White Lake, Mich.

[73] Assignee: Williams International Corp. L.L.C., Walled Lake, Mich.

[21] Appl. No.: 09/050,527

[22] Filed: Mar. 30, 1998

[51] Int. Cl.$^6$ ..................................................... F02C 7/26
[52] U.S. Cl. ..................... 60/39.142; 60/39.141; 60/734
[58] Field of Search ................ 60/39.141, 39.142, 60/39.48, 734; 244/53 A

[56] References Cited

U.S. PATENT DOCUMENTS

| | | | |
|---|---|---|---|
| 2,301,483 | 11/1942 | Van Daam | 220/83 |
| 2,742,758 | 4/1956 | Kelly | 60/39.141 |
| 2,952,428 | 9/1960 | Bridgeman | 244/135 |
| 3,628,758 | 12/1971 | Nichols | 244/135 |
| 3,691,730 | 9/1972 | Hickey et al. | 55/166 |
| 3,693,915 | 9/1972 | Ulanovsky | 244/135 R |
| 3,788,039 | 1/1974 | Bragg | 55/160 |
| 4,378,920 | 4/1983 | Runnels | 244/135 R |
| 4,556,180 | 12/1985 | Manatt | 244/135 R |
| 4,858,429 | 8/1989 | Herman | 60/39.141 |
| 4,922,708 | 5/1990 | Nelson | 60/734 |
| 4,926,629 | 5/1990 | Eick et al. | 60/734 |
| 5,052,174 | 10/1991 | Bak | 60/39.281 |
| 5,115,638 | 5/1992 | Reed et al. | 60/734 |
| 5,263,315 | 11/1993 | Shekleton et al. | 60/39.142 |

Primary Examiner—Louis J. Casaregola
Attorney, Agent, or Firm—Lyon, P.C.

[57] ABSTRACT

A turbojet engine one-shot start system utilizes ignition and fuel delivery system components capable of pneumatic actuation and pressurization to initiate the engine start sequence thereby obviating the need for expensive shielded electrical controls and pumps.

8 Claims, 2 Drawing Sheets

TURBOJET ENGINE START SYSTEM

The instant invention generally relates to a turbojet engine start system utilizing low cost fuel delivery and ignition components. Specifically, the invention provides for mechanical initiation of an engine start sequence thereby obviating the need for complex and costly electronic initiation.

BACKGROUND OF THE INVENTION

The engine start system of the present invention generally relates to mechanical actuation of components used to start a turbojet engine in a more economical fashion than currently known systems.

A one-shot start system for a turbojet engine is typically comprised of a pyrotechnic device called an ignitor activated by an initiator. Initiators (often called squibs) are generally electroexplosive devices utilizing an electrically heated bridgewire to ignite an explosive charge. The bridgewire is designed to ignite the charge only when a specific level of current is applied across it by a firing circuit. Since the initiator is electrically activated, the bridgewire and associated firing circuit must be carefully designed to prevent accidental activation from exposure to external electromagnetic signals produced by equipment such as conventional radars. Manufacturing an initiator wherein the bridgewire is electrically heated at a very precise firing current requires strict manufacturing and quality control processes that tend to increase the cost of the device.

A bullet operates in an analogous fashion to the aforementioned ignitor. A sharp blow from the hammer of a gun mechanically fires an initiator, usually termed a primer. The primer then ignites a gunpowder charge which propels the bullet down a gun's barrel. The primer serves the same actuation function for a bullet as the bridgewire initiator does for an ignitor. However, unlike the initiator, the primer is a percussion-activated device. As such, it is much cheaper to produce than the initiator since it has no critical electronic components. Additionally, the primer used in a bullet is not susceptible to accidental activation from electromagnetic radiation as evidenced by the longstanding practice of using conventional bullets in combat aircraft applications. The use of a percussion primer initiator for turbojet engine start system will substantially reduce overall system cost.

Most known turbojet engines utilize an electric fuel pump to meter fuel into an engine combustor. Engines using through-shaft fuel induction may utilize a low pressure fuel delivery system in conjunction with a pressurized fuel tank. This obviates the need for a high pressure fuel delivery device such as a pump. A low pressure fuel injector, for example an automotive injector, may be used in place of a metering fuel pump.

Conventional automotive injectors are typically operated by a solenoid actuated valve. These valves may be opened and closed by a pulse width modulated signal (PWM) which varies the valve actuation time by varying the signal pulse duration. (See for example U.S. Pat. No. 5,052,174, assigned to assignee of the present invention.) Fuel delivery systems using automotive type injectors have proven acceptable for use in turbojet engines when operating at pulse frequencies of 60 to 140 hertz. Automotive injectors are readily available, durable, and very cost effective when compared to metering pumps.

SUMMARY OF THE INVENTION

The present invention provides for a low cost turbojet engine start and fuel delivery system. The system relies on mechanical actuation to effect engine ignition and a low pressure fuel delivery device to meter fuel flow to the engine. This system is relatively simple in design, is easily integrated into existing turbojet engines and is not susceptible to inadvertent actuation caused by electromagnetic interference. In addition, this invention offers marked cost savings over similar systems currently in use by avoiding the use of expensive pyrotechnic devices and metering fuel pumps.

DETAILED DESCRIPTION OF THE PREFERRED EMBODIMENT(S)

The engine start system of the present invention utilizes pneumatic pressure to activate a pyrotechnic ignitor and simultaneously initiate fuel delivery to a turbojet engine having a through-the-shaft fuel induction system. Specifically, mechanical actuation of a valve charges a pneumatic circuit that initiates the engine starting sequence.

Figure 1:
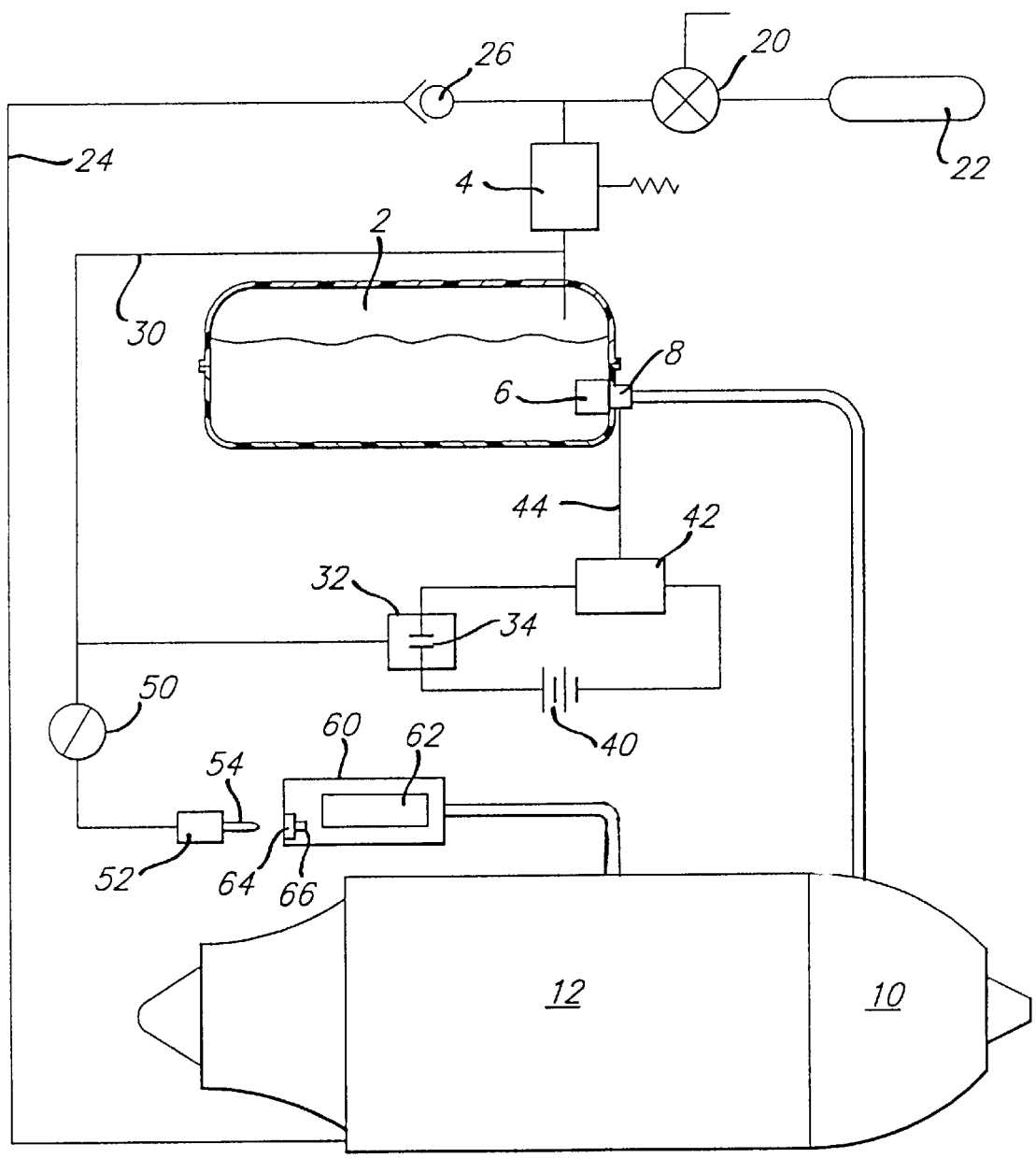
FIG. 1 is a schematic diagram of a preferred embodiment of the present invention.

As shown in FIG. 1 and in accordance with a preferred embodiment of the present invention, the start system has a fuel tank 2 capable of pressurization connected to a pressure regulator 4. An automotive type fuel injector 6 is disposed within the fuel tank 2. The fuel injector 6 utilizes a solenoid valve 8 capable of activation by a pulse width modulated signal to meter fuel to the combustor 10 of turbojet engine 12. The tank 2 must be capable of being pressurized to the degree required to provide fuel flow through the injector 6 to the engine 12. For example, thirty pounds per square inch (psi) of pressure in the system would be sufficient to supply fuel through a typical automotive type injector 6 to the engine 12.

A valve 20 is connected between a cylinder or reservoir of compressed gas 22 and the pressure regulator 4. The valve 20 initiates the flow of pressurized gas to the pressure regulator 4. A bleed air circuit 24 is connected between the turbojet engine 12 and a check valve 26. The check valve 26 is in turn connected to the pressure regulator 4 to supply pressurized air bled from the turbojet engine 12 to the regulator 4. The check valve 26 is oriented such that it prevents gas flow to the engine 12. The compressed gas reservoir 22 is required to charge the system until pressurized gas can be supplied from the engine 12 through the bleed air circuit 24, as described below.

A regulated pneumatic circuit 30 is connected to a pressure switch 32 and the pressure regulator 4. The pressure switch 32 is a device having a means for closing an electrical circuit 34 that is actuated at a predetermined pressure as sensed by the switch 32. Typically, conventional electrical contacts are provided as circuit closure means 34. The circuit closure means 34 is connected between a source of electrical potential 40 and an engine control computer 42 having a means for producing a pulse width modulated signal 44. The pulse width modulated signal 44 is in turn connected to the solenoid valve 8 of the fuel injector 6.

Figure 2:
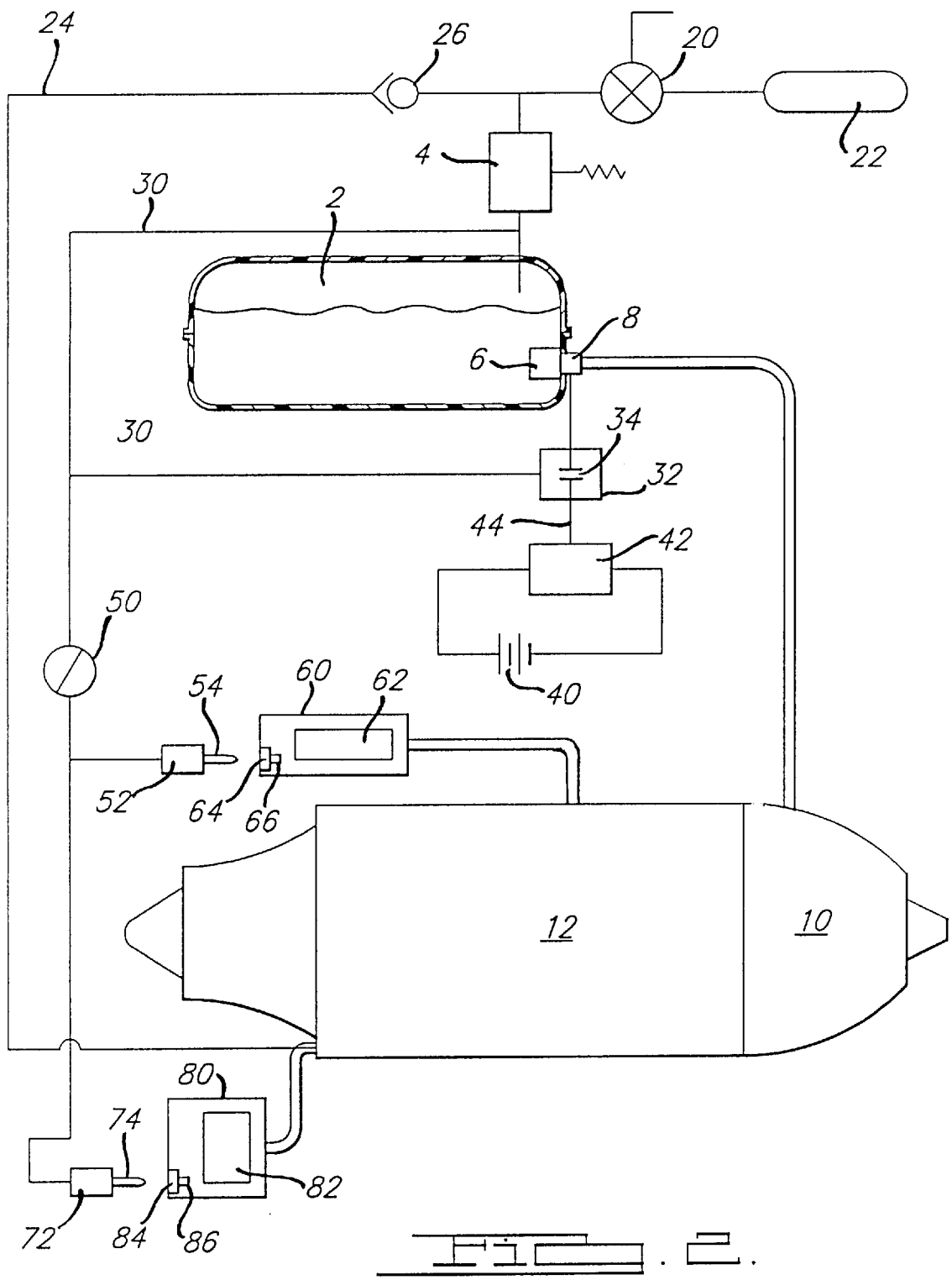
FIG. 2 is a schematic diagram of an alternative embodiment of the present invention employing a start cartridge to provide for rotation of the engine.

The engine control computer 42 must have means for supplying a pulse-width modulated (PWM) signal 44 to the solenoid valve 8. The pulse width modulated signal controls fuel flow through the solenoid valve 8 by varying the duration of the signal pulse thereby varying the amount of time the solenoid valve 8 is open. As shown in FIG. 2, and in accordance with an alternative embodiment of the invention, the circuit closure means 34 may be connected between the means for producing the pulse width modulated signal 44 and the injector solenoid valve 8.

The regulated pneumatic circuit 30 is also connected to a rupture disk 50 located downstream of the pressure switch 32. The rupture disk 50 is typically a membrane or diaphragm designed to burst at a predetermined pressure thereby allowing the flow of pressurized gas past the membrane and through the disk 50. The rupture disk 50 is connected to a first pneumatic cylinder 52 that is provided with a first striker 54. A pyrotechnic initiator 60 containing propellant 62 is provided with a chamber 64 enclosing a percussion primer charge 66. The chamber 64 is slidably engaged by the striker 54. The initiator 60 is connected to the engine 12 such that hot gas produced by ignition of the propellant 62 is directed into the combustor 10.

In an alternative embodiment of the invention shown in FIG. 2 a second pneumatic cylinder 72 provided with a second striker 74 is also connected to the rupture disk 50. A gas generator cartridge 80 containing propellant 82 is provided with a chamber 84 enclosing a second percussion primer charge 86. The cartridge chamber 84 is slidably engaged by the striker 74 of the second pneumatic cylinder 72. The cartridge 80 is connected to the engine 12 such that hot gas produced by ignition of the propellant 82 is directed into the engine to effect rotation thereof.

Operation of the start system is initiated when the valve 20 is opened. Compressed gas is thereby released from the reservoir 22. The valve 20 is actuated electrically, mechanically, or in any other suitable fashion. In a preferred embodiment of the invention the valve 20 is mechanically actuated thereby obviating the need for electrical controls. The compressed gas flows through the pressure regulator 4 and into the fuel tank 2 and the regulated pneumatic circuit 30. The tank 2 and the circuit 30 will charge with gas until the setpoint of the regulator 4 is reached. Proper pressurization of the fuel tank 2 is necessary to supply pressurized fuel to the injector 6.

The pressure switch 32 connected to the regulated pneumatic circuit 30 actuates the circuit closure means 34 when pressure at the switch 32 reaches a predetermined level, thereby providing electrical potential to the computer 42 which initiates fuel flow to the engine 12. The computer 42 then provides the pulse width modulated signal 44 to the solenoid valve 8. In accordance with the alternative embodiment of the invention shown in FIG. 2, the actuation of the circuit closure means 34 at a predetermined pressure switches on the injector control signal 44 from the computer 42 to the solenoid valve 8. In both embodiments of the invention the pulse width modulated signal 44 provided to the injector 6 by the control computer 42 varies fuel flow to the engine 12 by varying the amount of time the solenoid valve 8 is open.

The burst disk 50 ruptures when the gas pressure in the regulated circuit 30 reaches the setpoint of the disk 50, thereby delivering a charge of pressurized gas to the first pneumatic cylinder 52. This pressurization forces the first striker 54 into the initiator chamber 64 and into contact with the percussion primer charge 66. When contacted, the primer 66 fires and ignites the initiator propellant 62. The subsequent combustion of the propellant 62 generates hot gas directed into the combustor 10. The hot gas in the combustor 10 ignites the fuel delivered by the injector 6. The engine 12 then begins accelerating to idle speed. The burst disk 50 is selected to rupture at a pressure slightly higher than the setting of the pressure switch 32 so that fuel delivery to the combustor 10 has already begun prior to the ignition of the initiator propellant 62.

Once the engine 12 is running, the bleed air circuit 24 begins to pressurize with compressed air supplied by the engine 12. As fuel is consumed in the engine 12 and the fuel level in the tank 2 begins to decrease, compressed gas from the reservoir 22 continues to expand into the fuel tank 2. When the pressure in the bleed air circuit 24 becomes greater than the pressure supplied by the reservoir 22, the check valve 26 is biased open thereby allowing the engine bleed air to pressurize the system. This allows the fuel system to be operated under pressurization while minimizing the quantity of compressed gas required resulting in savings in both cost and weight.

In accordance with an alternative embodiment of the instant invention and as shown in FIG. 2, the second pneumatic cylinder 72 also receives a charge of compressed gas when the burst disk 50 ruptures. This pressurization forces the second striker 74 into the start cartridge chamber 84 and into contact with the second percussion primer charge 86. When contacted, the second primer 86 fires and ignites the start cartridge propellant 82. The combustion of the propellant 82 generates hot gas directed into the engine 12. The velocity of the gas provided by the start cartridge 80 directed into engine 12 causes engine 12 to rotate, thereby initiating acceleration to idle speed.

While the preferred embodiment of this invention has been disclosed, it will be appreciated by one of ordinary skill in the art that the instant invention is susceptible to various modifications without departing from the scope of the following claims.

I claim:

1. A start system for a turbojet engine having a through-shaft fuel induction system and an engine control computer connected to a source of potential, said computer having means for producing a pulse width modulated fuel control signal comprising:

a fuel tank capable of pressurization;

a fuel injector disposed within said tank, said injector having a solenoid actuated valve connected to the means for producing the pulse width modulated signal;

a pressure regulator connected to said tank, said regulator also connected to a pneumatic circuit;

a compressed gas reservoir;

a valve connected between said reservoir and said pressure regulator for releasing the compressed gas to said regulator;

a bleed air circuit connected between said turbojet engine and said pressure regulator, said bleed air circuit having a check valve interposed between said regulator and said engine, the check valve being oriented to prevent gas flow in the direction of said engine;

a pressure switch connected to said pneumatic circuit, said switch having means for closing an electrical circuit at a predetermined pressure connected between said source of potential and said computer whereby potential is supplied to said computer at a predetermined pressure;

a rupture disk connected to said pneumatic circuit downstream of said pressure switch;

a pneumatic cylinder connected to said pneumatic circuit downstream of said rupture disk, said cylinder having a slidably movable striker;

and a pyrotechnic initiator connected to said engine, said initiator containing propellant and having a primer cavity disposed about a primer and telescoped over the striker of said cylinder, the propellant being disposed in proximity to the primer whereby ignition of the primer effects ignition of the propellant.

2. The start system of claim 1 further comprising;

a second pneumatic cylinder connected to said pneumatic circuit downstream of said rupture disc, said second cylinder having a slidably movable striker and, a gas generator cartridge connected to said engine, said cartridge containing propellant and having a second primer cavity disposed about a second primer and telescoped over the striker of said second cylinder, the cartridge propellant being disposed in proximity to the second primer whereby ignition of the primer effects ignition of the propellant.

3. The start system of claim 1 in which the means for closing an electrical circuit comprises:

a set of electrical contacts that are biased closed by said pressure switch at a predetermined pressure.

4. The start system of claim 1 in which the means for closing an electrical circuit are connected between the solenoid actuated valve and the means for producing a pulse width modulated signal of said computer, whereby the signal is supplied to the valve when said pressure switch senses a predetermined pressure.

5. The start system of claim 4 in which the means for closing an electrical circuit comprises:

a set of electrical contacts that are biased closed by said pressure switch at a predetermined pressure.

6. The start system of claim 2 in which the means for closing an electrical circuit comprises:

a set of electrical contacts that are biased closed by said pressure switch at a predetermined pressure.

7. The start system of claim 2 in which the means for closing an electrical circuit are connected between the solenoid actuated valve and the means for producing a pulse width modulated signal of said computer, whereby the signal is supplied to the valve when said pressure switch senses a predetermined pressure.

8. The start system of claim 2 in which the means for closing an electrical circuit comprises:

a set of electrical contacts connected between the solenoid actuated valve and the means for producing a pulse width modulated signal of said computer, the contacts being biased closed when said pressure switch senses a predetermined pressure whereby the signal is supplied to the solenoid valve.

* * * * *